US009364779B2

(12) United States Patent
Rowe

(10) Patent No.: US 9,364,779 B2
(45) Date of Patent: Jun. 14, 2016

(54) METHOD AND EQUIPMENT FOR MEASURING THE FILTER SECTORS IN DISC FILTERS

(71) Applicant: Nicholas Rowe, Karlstad (SE)

(72) Inventor: Nicholas Rowe, Karlstad (SE)

(73) Assignee: Valmet AB, Sundsvall (SE)

( * ) Notice: Subject to any disclaimer, the term of this patent is extended or adjusted under 35 U.S.C. 154(b) by 58 days.

(21) Appl. No.: 14/407,115

(22) PCT Filed: Jun. 12, 2013

(86) PCT No.: PCT/SE2013/050684
§ 371 (c)(1),
(2) Date: Dec. 11, 2014

(87) PCT Pub. No.: WO2013/187838
PCT Pub. Date: Dec. 19, 2013

(65) Prior Publication Data
US 2015/0128434 A1 May 14, 2015

(30) Foreign Application Priority Data
Jun. 12, 2013 (SE) ........................................ 1250623

(51) Int. Cl.
*G01B 5/20* (2006.01)
*B01D 33/21* (2006.01)
*G01B 3/22* (2006.01)
*G01B 5/30* (2006.01)
*D21C 9/06* (2006.01)

(52) U.S. Cl.
CPC *B01D 33/21* (2013.01); *D21C 9/06* (2013.01); *G01B 3/22* (2013.01); *G01B 5/20* (2013.01); *G01B 5/30* (2013.01)

(58) Field of Classification Search
CPC ............... G01B 3/12; G01B 5/20; G01B 5/30
See application file for complete search history.

(56) References Cited

U.S. PATENT DOCUMENTS

| 6,488,468 | B1* | 12/2002 | Danielsson | F04D 7/045 415/126 |
| 6,574,882 | B1* | 6/2003 | Kondo | G01B 3/12 33/773 |
| 9,133,579 | B2* | 9/2015 | Sjostrom | D21D 1/22 |
| 2004/0045913 | A1* | 3/2004 | Flanagan | B01D 33/21 210/780 |

(Continued)

FOREIGN PATENT DOCUMENTS

FI WO2006056649 6/2006
SE WO02063095 8/2002

(Continued)

*Primary Examiner* — G. Bradley Bennett
(74) *Attorney, Agent, or Firm* — Rolf Fasth; Fasth Law Offices

(57) ABSTRACT

The method and equipment relates to the measurement of deflections of filter sectors in a disc filter. The filter discs in the disc filter are constituted by a number of filter sectors, and the distance between a position fixed relative to the filter, most commonly the scraper itself, and the filter surface is conventionally measured by manual measurement methods. The equipment is instead used that has a measuring head with a quick-release coupling for its mounting fixed in the filter, and a position sensor in the measuring head that measures the distance between the measurement arrangement and the surface of the filter disc in order to form momentary measurement results. The momentary measurement results are transferred by a data transfer link from the measurement arrangement to a data collection unit PC that has a memory.

8 Claims, 8 Drawing Sheets

(56) References Cited

U.S. PATENT DOCUMENTS

| | | |
|---|---|---|
| 2007/0278162 A1 | 12/2007 | Combrowski |
| 2011/0203988 A1* | 8/2011 | Gaudfrin ................ B01D 33/21 210/413 |
| 2014/0109419 A1* | 4/2014 | Shindo ................... G01B 5/008 33/502 |
| 2015/0283485 A1* | 10/2015 | Bott ....................... B01D 33/21 210/359 |
| 2015/0290566 A1* | 10/2015 | Luukkanen ............ B01D 33/21 210/797 |
| 2015/0345996 A1* | 12/2015 | Brackley ................. G01D 5/20 65/29.12 |
| 2016/0038857 A1* | 2/2016 | Rantala .................. B01D 33/21 210/359 |
| 2016/0045871 A1* | 2/2016 | Liebermann ........... B01D 33/21 210/321.68 |

FOREIGN PATENT DOCUMENTS

| | | |
|---|---|---|
| SE | WO2009072978 | 6/2009 |
| SE | WO2011078749 | 6/2011 |
| WO | WO9915255 | 4/1999 |

* cited by examiner

Fig. 7

|     | DISC 5 |        |
| --- | ------ | ------ |
|     | FS     | FS ∑α  |
| #1  | 15,9   | +0,8   |
|     | 16,1   |        |
|     | 16,3   |        |
|     | 16,5   |        |
|     | 16,7   |        |
| #2  | 17,0   | 0      |
|     | 17,0   |        |
|     | 17,0   |        |
|     | 17.0   |        |
|     | 17,0   |        |
| #3  | 16,7   | -5,0   |
|     | 15,7   |        |
|     | 14,7   |        |
|     | 13,7   |        |
|     | 12,7   |        |

Fig. 8

METHOD AND EQUIPMENT FOR MEASURING THE FILTER SECTORS IN DISC FILTERS

PRIOR APPLICATION

This application is a U.S. national phase application based on International Application No. PCT/SE2013/050684, filed 12 Jun. 2013 that claims priority from Swedish patent application number 1250623-4 filed 13 Jun. 2012.

TECHNICAL AREA

The present invention concerns a method and equipment for the measurement of filter sectors in disc filters.

THE PRIOR ART

Disc filters are used at several process positions in a paper pulp mill, not only as fibre filters but also as filters in the causticisation process.

Fibre suspensions are dewatered in fibre filters and the collected fibre cake that forms on the filter discs during one rotation is scraped off in its entirety.

Disc filters are used in the causticisation during chemical recycling, however, in a completely different manner, where a technology known as "precoating" of the filter surface is most often used. Independently of whether the filters are green liquor, white liquor or lime sludge filters, it is not possible to reach the desired purity of the filtrate (green liquor, white liquor or washing fluid) without first coating the filter surface with a layer of lime sludge. The filter surface is most often a fine-mesh cloth held in tension across a perforated metal frame, although this cloth can permit small particles of lime sludge to pass. At the same time as the mesh of the cloth must be fine, it must not produce too large pressure drop, since this limits the filtration capacity. The layers of lime sludge on the filter surface will in this case function as an extra filter element, and these layers are most often built up by a careful increase in the pressure drop across the filter surface, before the filtration can start and give a filtrate of the desired purity. The technique means that the layers of lime sludge will capture most of the lime sludge particles in the process fluid that is to be filtered, but it eventually leads to the surface of the layers of lime sludge becoming clogged and needing to be renewed. This is normally done by the use of a knife in which an operator scrapes away the uppermost, clogged, surface of the layers of lime sludge. During start-up, first a completely new layer of lime sludge of a given thickness is formed, after which 5-10% of the thickness is removed at the subsequent scraping after a few hours of operation, and this occurs 4-5 times until the layer of lime sludge has reached a minimum permitted thickness. A new layer of lime sludge is then built up.

One problem with these disc filters with precoating is that the pressure drop, and thus the filtration capacity, is directly dependent on the thickness of the layer of lime sludge. Since the disc filters are built up from filter sectors that are fastened to a hollow shaft, the settings of the individual filter sectors may differ. An individual filter sector may, for example, be rotated in the filter housing such that, for example, the forward edge (seen in the direction of rotation) is positioned at a greater distance from a scraper than the rear edge. The layers of lime sludge at the forward edge will then become thicker than at the rear edge, and the pressure drop will for this reason be higher at the forward edge. Furthermore, the complete filter surface in a filter sector may be positioned lower than other filter sectors. The layer of lime sludge on this lower filter sector will then become thicker than on other filter sectors, and the pressure drop will for this reason be higher, which will result in a lower filtration capacity.

For the measurement and monitoring of the deflections in these filter sectors, a time-consuming manual procedure has been used in which the distance between the scraper and the filter sector is measured by rulers while the disc filter is rotated stepwise to a new measurement position. Such measurement of a disc filter with more than 10 filter discs with 18-20 filter sectors has required some 1-2 working days. The measurement process is also associated with risks for the personnel since it is necessary to measure inside a machine with cramped space while the disc filter is rotated, and where the distance between a sharp scraper and the surface of the filter is measured using a ruler. Since the measurement process is time-consuming, the complete production line must also be closed down during this period, and this causes a large loss of income for the paper pulp mill.

THE PURPOSE OF THE INVENTION

A first purpose of the invention is to be able to minimise the duration of interruption in operation for the paper pulp mill while the disc filters are measured.

A second purpose is to obtain a more reliable measurement of the disc filters than is possible to obtain by measurement with a ruler and taking notes of the deflections in a list.

A third purpose is to be able to obtain a rapid measurement of the disc filter with stored measurement results that can be evaluated at a later time. The measurement may in certain cases show that the filter sectors have deflections that lie within acceptable limits, and it will in this case be possible to omit the adjustment operation. If it is revealed during the evaluation that certain filter sectors have too great deflection, it is possible to plan adjustments only for the particular filter sectors that require adjustment.

A fourth purpose is to be able to obtain a documented measurement of the disc filters before adjustment, and a verifying measurement of the disc filters after adjustment of the filter sectors that require adjustment.

A fifth purpose is to be able to obtain a documented measurement of the deflections of filter sectors in a disc filter such that it is possible to calculate the filtration capacity in the disc filter, which capacity depends on the pressure drop across each part of a filter sector and between different filter sectors.

A sixth purpose is to verify the current deflections of the filter sectors of the disc filter such that it is possible to influence the scraping function in the disc filter so that this can be optimised and obtaining a safe margin against the scraper not reaching the surface of the filter and damage it.

BRIEF DESCRIPTION OF THE INVENTION

The method according to the invention is used for the measurement of the deflection of a filter sector in a disc filter. The disc filter consists of at least one filter disc arranged on a rotating hollow shaft, which filter disc is constituted by at least 10 hollow filter sectors, each one of which is covered by a filter element and has a hollow filter mounting that is connected to the rotating hollow shaft in order to lead away filtrate that has collected in the filter sectors. A fixed support frame that is independent of the filter disc is mounted at a distance from each filter disc. The method is characterised in that a measuring head is mounted on the support frame with a measurement arrangement in the measuring head that measures the distance between the measurement arrangement and the surface of the filter disc. The hollow shaft is rotated while the measurement arrangement measures the distance between the measuring head and the surface of the filter disc at at least two measuring points for each filter sector. The measured values that are obtained are stored in a data collection unit connected to the measuring head, after which the measurement results collected are used to determine the current deflections of individual filter sectors and to constitute the information on which adjustment of the filter sectors to minimise the deflections is based.

It is possible with this method to replace a lengthy manual measurement process by a rapid collection of data that gives all of the information required to determine the current status of the filter deflection and to constitute the information on which to base a subsequent selective adjustment of the particular filter sectors that have the greatest deflection.

According to preferred embodiments of the method, the collected measuring points are coupled to a unique filter sector. It is appropriate that this take place through the collected measuring points being coupled to a unique filter sector through synchronisation of the rotation of the hollow shaft with the collection of the measurements. By using the changes of shape between the filter sectors, it is possible to couple the collected measuring points to a unique filter sector by detecting the start and end of a filter sector and by collecting the measurements across the relevant filter sector.

The equipment according to the invention is used to measure the deflection of a filter sector in a disc filter. The disc filter consists of at least one filter disc arranged at a rotating hollow shaft. The filter disc is constituted by at least 10 hollow filter sectors, each one of which is covered with a filter element and has a hollow filter mounting that is connected to the rotating hollow shaft in order to lead away the filtrate that has collected in the filter sectors. Furthermore, a fixed support frame that is independent of the filter disc is mounted at a distance from each filter disc. The equipment is characterised in that it comprises a measuring head with a quick-release coupling by which it is mounted on the support frame, a position sensor in the measuring head that measures the distance between the measurement arrangement and the surface of the filter disc in order to form the momentary measurement result, a data transfer link for the transfer of momentary measurement results from the measurement arrangement, a data collection unit connected to the measurement arrangement through the data transfer link with a memory for the storage of momentary measurement results, and synchronisation means for the coupling between momentary measurement results and the individual filter sectors while the hollow shaft is rotating.

According to preferred embodiments of the equipment, the measuring head may comprise a pre-stressed measurement probe that is held against the surface of the filter disc by a spring and that follows the surface of the filter disc continuously. It is appropriate also that the tip of the measurement probe that is in contact with the surface of the filter disc is constituted by a running wheel that rolls on the surface of the filter disc. It is appropriate that the running wheel has a radius that is in the interval 1-5 times larger than $R_1$, in one special embodiment that exploits the changes of shape of the filter disc between filter sectors, where the transition between two filter sectors forms a depression in the surface of the filter disc with a radius $R_1$ at the edge of the filter sector in intervals 5-20 mm, which edge radii form the depression.

DESCRIPTION OF DRAWINGS

FIG. 7 shows one type of measurement protocol stored in the measuring equipment for the detection of deflections in individual filter sectors, and FIG. 8 shows a supplementary type of measurement protocol stored in the measuring equipment for the detection of twisting in individual filter sectors.

DETAILED DESCRIPTION OF THE INVENTION

Figure 1:
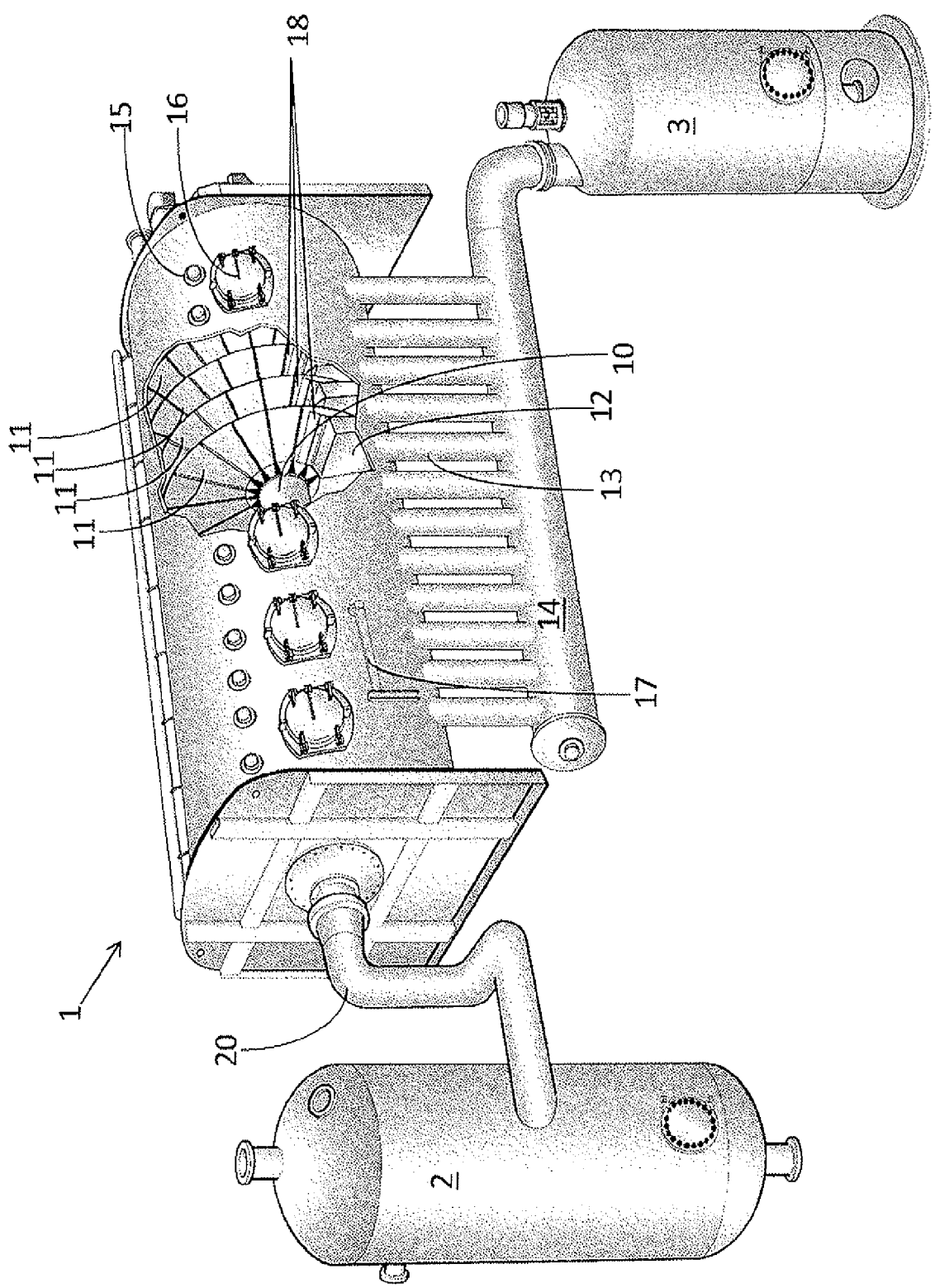
FIG. 1 shows in perspective a typical disc filter for the filtration of white liquor in the causticisation process.

FIG. 1 shows a disc filter 1, here in the form of a disc filter under pressure in which the discs are inside a pressure vessel. The pressure vessel has been drawn partly opened in the drawing in order to show four filter discs, which are fixed arranged on and co-rotating with a shaft 10. A lime sludge chute 12 is located between the discs 11, on the upper edge of which chute is located a scraper 18 parallel to the surface of the discs. Lime sludge that is scraped from the filter falls into the lime sludge chute 12, down to the chute connection pipe 13 and onwards to a collection pipe 14, before the lime sludge finally reaches the lime sludge tank 3. Pure filtrate, white liquor in the case in which this is a white liquor filter, passes through the surfaces of the discs and is led down to the shaft 10, which is a conventional hollow shaft, and onwards through the filtrate line 20 to a filtrate tank 2. This drawing shows a filter with 11 filter discs. The drawing shows also a regulator arm 17 for the scraper mechanism, inspection hatches 15 through which it is possible to monitor the function, and manholes 16 that can be opened to obtain access for any service or adjustment of the discs, scrapers or filter cloths that may be required.

Figure 2:
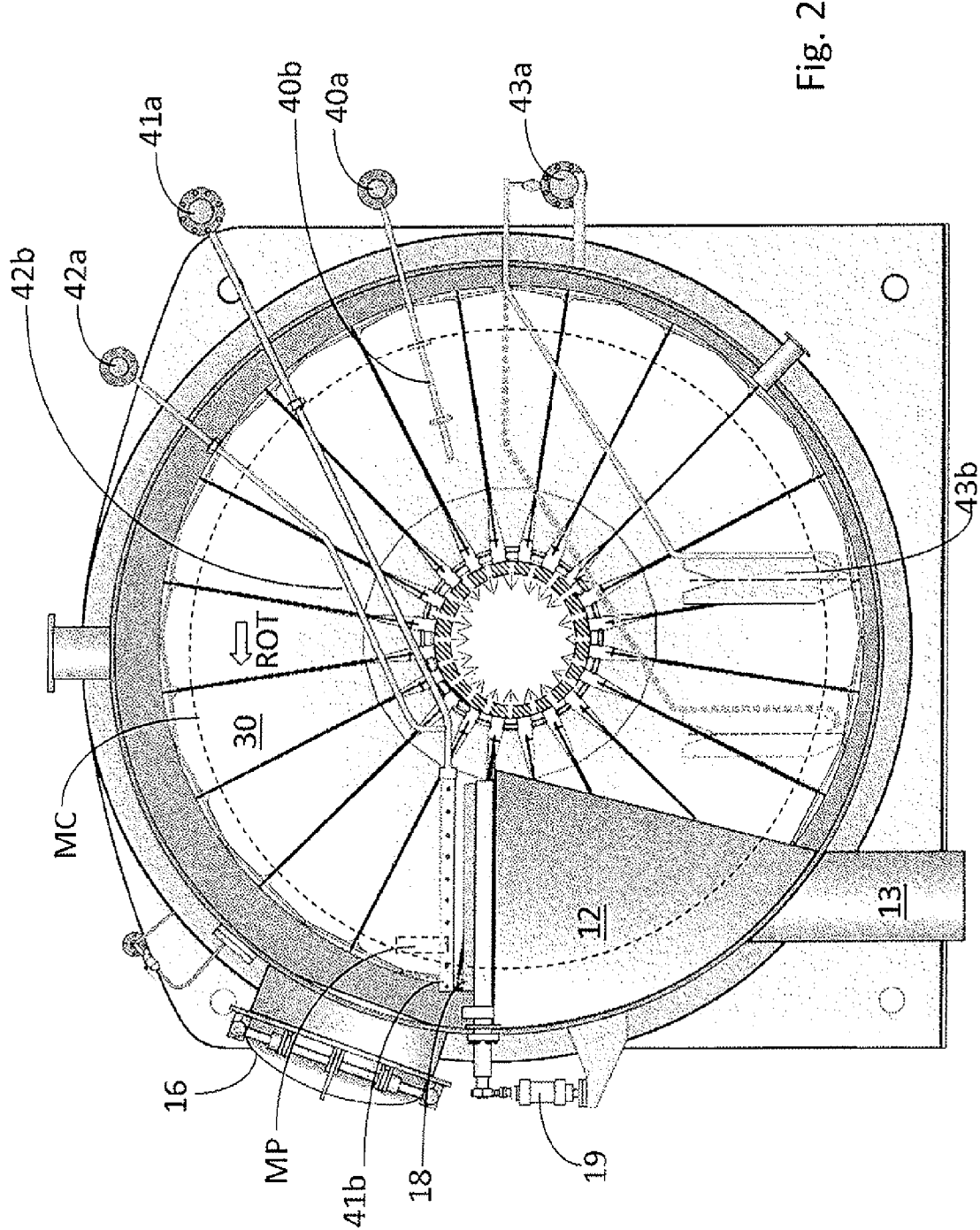
FIG. 2 shows in side view a filter disc for a disc filter.

FIG. 2 shows a filter disc in a side view, which filter disc is built up from a number of filter sectors 30. The drawing shows a filter made up from 20 filter sectors. Each filter sector 30 is fixed mounted at the hollow shaft 10 through a filter mounting 31 in the form of a pipe 31a that is inserted through a corresponding drilled hole in the hollow shaft 10. The filter maintains a level of causticised white liquor just under the upper edge of the lime sludge chute 12, and the filter disc and the hollow shaft rotate in the direction denoted by "ROT" such that the lime sludge that has collected on the surface of the filter can be scraped off with the scraper 18. The filter contain a number of addition points for washing liquid and dilution liquid at various positions, and the following are shown in the drawing: a connection 40a for washing liquid that is spread over the filter by a pipe 40b provided with a nozzle, a connection 41a for chute dilution liquid that is spread at the upper edge of the chute by a pipe 41b provided with a nozzle, and a connection 42a for cake removal liquid that is spread over the filter by a pipe 42b that is provided with a nozzle. There is present also at least one airlift pump 43b that is connected to a line 43a with air under pressure, which provides stirring at the bottom of the vessel such that sedimentation of lime sludge is counteracted. It can here be seen that it is possible to gain access to the complete mechanism of the scraping function through the manhole cover 16.

Figure 3:
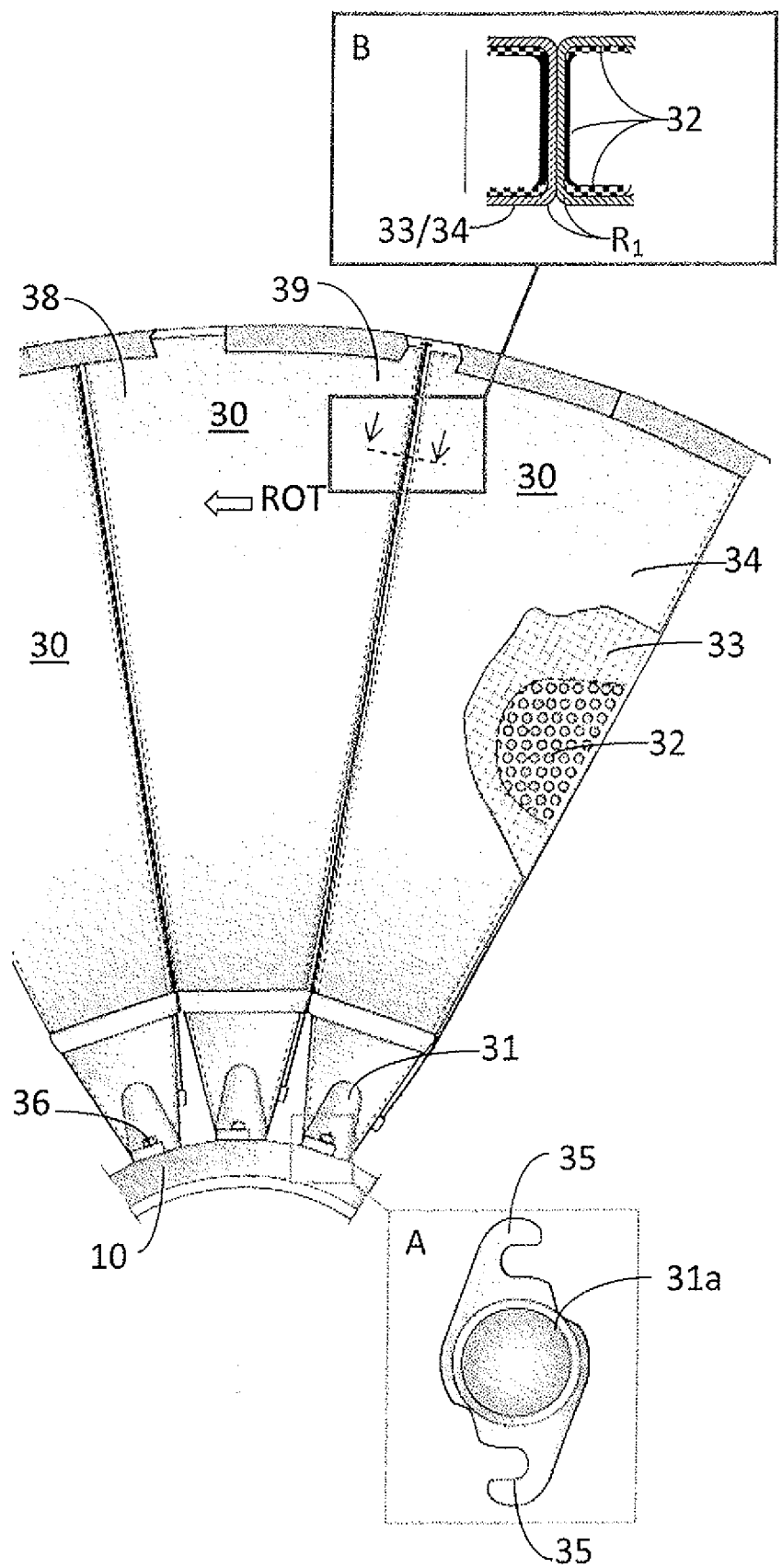
FIG. 3 shows a part of a filter disc with three filter sectors.

FIG. 3 shows a part of a filter disc with three filter sectors 30. Each filter sector 30 is built up from a first inner perforated metal frame 32, which is in turn covered with a first coarse filter cloth 33 and a fine filter cloth 34 that lies on top of it. The perforated metal frame 32 surrounds a hollow compartment that receives the filtrate that has passed the filter surface, which hollow compartment is connected to a pipe 31a that leads the filtrate down into the hollow shaft 10. The pipe 31a is mounted in a drilled hole in the hollow shaft where the pipe is first pressed down into the drilled hole after which the filter sector is turned such that fastening lugs 35 grip bolts 36, which are subsequently tightened. These fastening lugs allow a certain amount of adjustment of the rotational position of the filter sector such that the forward edge 38 can be placed in the same radial plane as the rear edge (which minimises deflection across the filter sector). A view seen from below the filter mounting 31 is shown in Box A. A cross-section seen though X-X in the drawing is shown in Box B, where the transition between two filter sectors is shown. This transition between filter sectors has a radius $R_1$ in order to minimise loading at the edges of the filter cloths.

Figure 4:
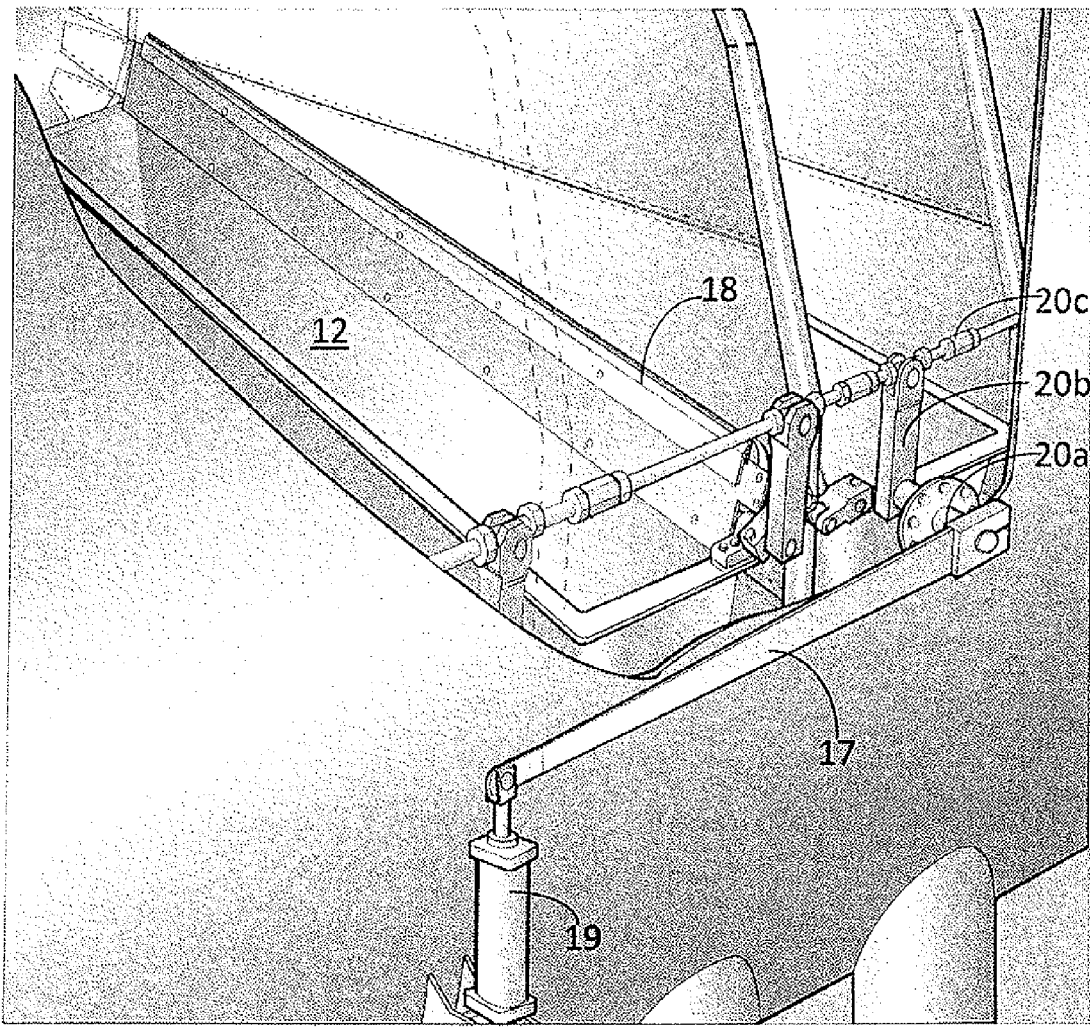
FIG. 4 shows in perspective the appearance of a scraper arrangement above a lime sludge chute in a disc filter.

FIG. 4 shows the appearance of a scraper arrangement above a lime sludge chute 12 in a disc filter. A regulator arm 17 for the scraper mechanism can be influenced by a servo unit 19, preferably a hydraulic cylinder or an air cylinder. The regulator arm 17 influences the position of the scraper 18 relative to the surface of the filter through a linkage 20a-20b-20c in a conventional manner. Several links 20b for the influence of several scrapers can be activated at the same time through an adjustable support rod 20c.

Figure 5:
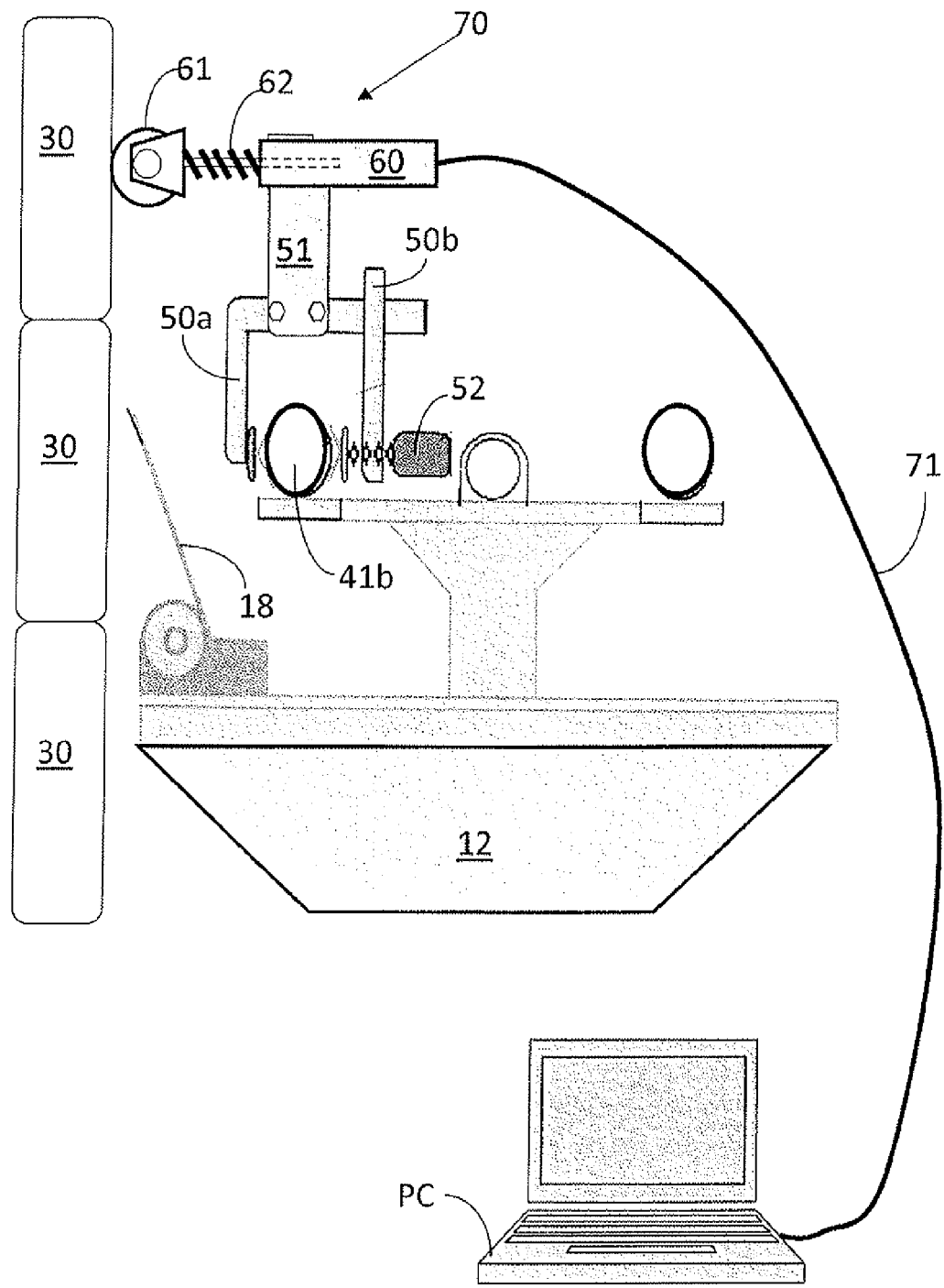
FIG. 5 shows the measuring equipment according to the invention installed in a disc filter.

FIG. 5 shows the measuring equipment according to the invention installed in a disc filter. The equipment comprises measuring heads 70 with a quick-release coupling for mounting on a suitable fixed support frame in the disc filter. In the embodiment shown, the pipe 41b that is equipped with nozzles is used as this support frame, but any other stationary structure can be used as support frame for the measuring equipment. In a simple embodiment shown in the drawing, the quick-release coupling can be constituted by two fixed shanks 50a and 50b that have an arrangement that has the nature of a screw clamp for attachment across the support frame with the handle 52.

The measuring head 60-61-62 is located on a bracket 51 that is fixed arranged at the shanks 50a/50b, which measuring head in the embodiment shown is an electromechanical measuring head with a running wheel 61 that rolls on the surface of the filter disc or filter sectors. The running wheel is placed under tension against the surface of the filter by a spring 62 such that this running wheel follows the surface of the filter continuously. As is shown in FIG. 3B, the transition between two filter sectors can form a depression in the surface of the filter disc with a radius $R_1$, in the interval 5-20 mm, at the edge of the filter sector, which edge radii form the depression, and for this reason it is appropriate that the running wheel be given a radius that is in the interval 1-5 times larger than $R_1$, in order not to fasten in the depression, while at the same time still being capable of detecting the passage of a depression and the transition to the next filter sector.

The position sensor is located in a housing 60 and detects the position at the shaft, which is connected to the holder of the running wheel.

As an alternative to an electromechanical measuring head, an optical measurement of distance can be used, for example one with laser measurement, which will not cause any wear of the filter cloth.

The signal from the position sensor can be transferred by a data transfer link 71 connected to a suitable data collection unit PC. Alternatively, the data transfer can take place in a wireless manner using, for example, bluetooth, and the measuring head may have an integrated source of power or a battery. As is shown in the drawing, the data collection unit PC may be a conventional laptop computer that contains memory for the storage of measurement results that have been collected.

It is possible with this equipment to implement a rapid method for the measurement of the deflections of filter sectors in a disc filter. The measuring head 61-62-63 is mounted on the support frame 41b with a position sensor 60 in the measuring head that measures the distance between the measurement arrangement and the surface of the filter disc. It is appropriate that the measuring head be placed in a measurement position indicated by MP in FIG. 2, i.e. close to the periphery of the disc, such that the measurement is carried out on a measurement circle MC, indicated by a dashed circle. The hollow shaft 10 is rotated while the measurement arrangement measures the distance between the measuring head and the surface of the filter disc at at least two measuring points for each filter sector. The measured values that are obtained are stored in a data collection unit connected to the measuring head, after which the measurement results collected are used to determine the current deflections of individual filter sectors and to constitute the information on which adjustment of the filter sectors to minimise deflection is based. The measurement can be carried out in a number of ways, but it is advantageous that the measuring points that have been collected are coupled to a unique filter sector 30. This can be carried out manually, such that the collection of measurement results is started when the measuring head comes into contact with a marked filter sector, and ended when the marked filter sector returns after rotation of the hollow shaft by one complete revolution.

Alternatively, the collected measuring points can be coupled to a unique filter sector through synchronisation of the rotation of the hollow shaft with the collection of the measurements.

Since the transition between filter sectors may have a depression, the measuring equipment can automatically detect this transition at the start and end of a filter sector and it can subsequently store the collected measurement results for this filter sector.

Figure 6A:
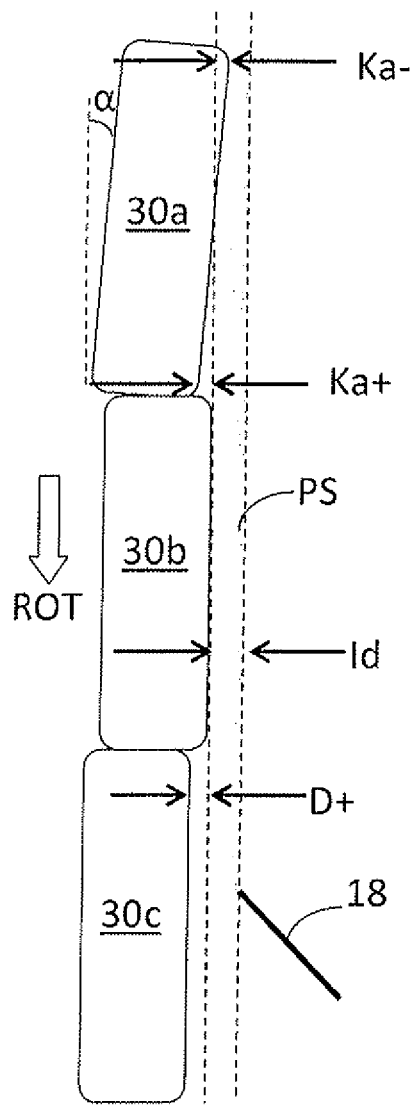
FIG. 6a shows how the filter sectors can be set with either a twist at the filter mounting or a displacement from the ideal position.

FIG. 6a shows the principle of how the filter sectors 30a, 30b and 30c can be set with either a twist $\alpha$ at the filter mounting, as is shown for the filter sector 30a or a displacement from the ideal position, as is shown for the filter sector 30c. Filter sector 30b is shown here without any deflection, set such that the precoating layer PS forms ideal thickness Id. For the twisted filter sector 30a, it is shown that the precoating layer acquires at its forward edge (relative to the direction of rotation ROT) an undesired increase Ka+, while it acquires at the rear edge an undesired reduction Ka−. For the displaced filter sector 30c, the precoating layer acquires an undesired increase D+ of its thickness. The type of the deflection of the filter sectors is shown in the drawings in principle, and a combination of the deflections that are shown for the filter sectors 30a and 30c can be present in one filter sector.

Figure 6B:
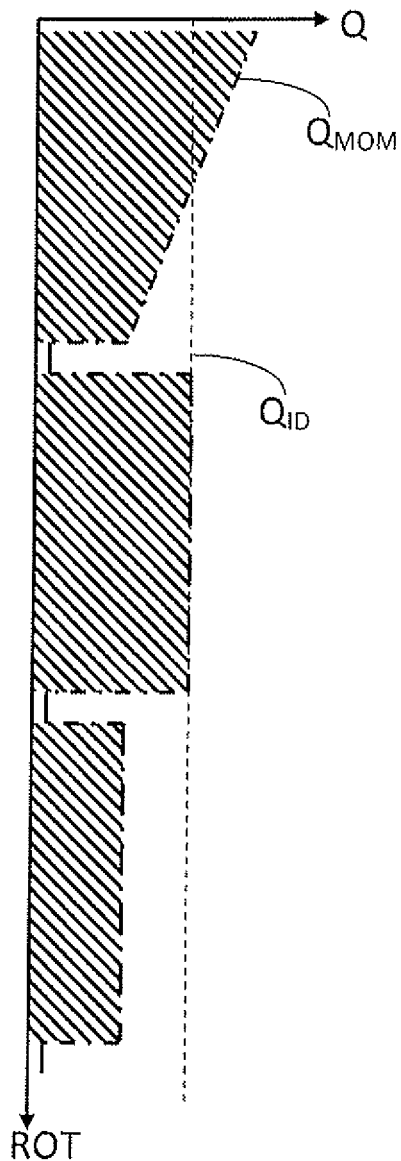
FIG. 6b shows the filtration flow through the filter sectors as a function of the thickness of the layer of lime sludge.

FIG. 6b shows the filtration flow Q through the filter sectors is influenced as a function of the thickness of the layer of lime sludge in FIG. 6a. The flow Q is given by the function:

$$Q = \frac{K \cdot \Delta P}{\mu \cdot L}$$

where K is the permeability of the filtercake or precoating, ΔP is the pressure drop across the filter cake, μ is the viscosity of the white liquor, and L is the thickness of the filter cake or precoating. It is thus possible to use this flow equation to calculate the total flow through a disc filter with the deflections of the filter sectors that have been measured.

It is shown that the momentary flow $Q_{MOM}$ is largest at the rear edge of the filter sector 30a with a thickness of the layer of precoating that is too small, due to the thinnest precoating. The momentary flow across this filter sector then falls as the forward edge of the filter sector is approached. There is no open filter surface at the transition to the next filter sector 30b, for which reason the flow falls momentarily. The flow through the filter sector 30b is constant at all times, since the thickness of the layer of precoating is constant. The flow through the filter sector 30c, however, is reduced since the layer of precoating is much thicker. It is made clear that the filtration capacity in the form of filtrate flow is influenced to a large extent, depending on the deflections of the filter sectors that are present. Furthermore, the purity of the filtrate is influenced when the precoating varies.

Figure 7:
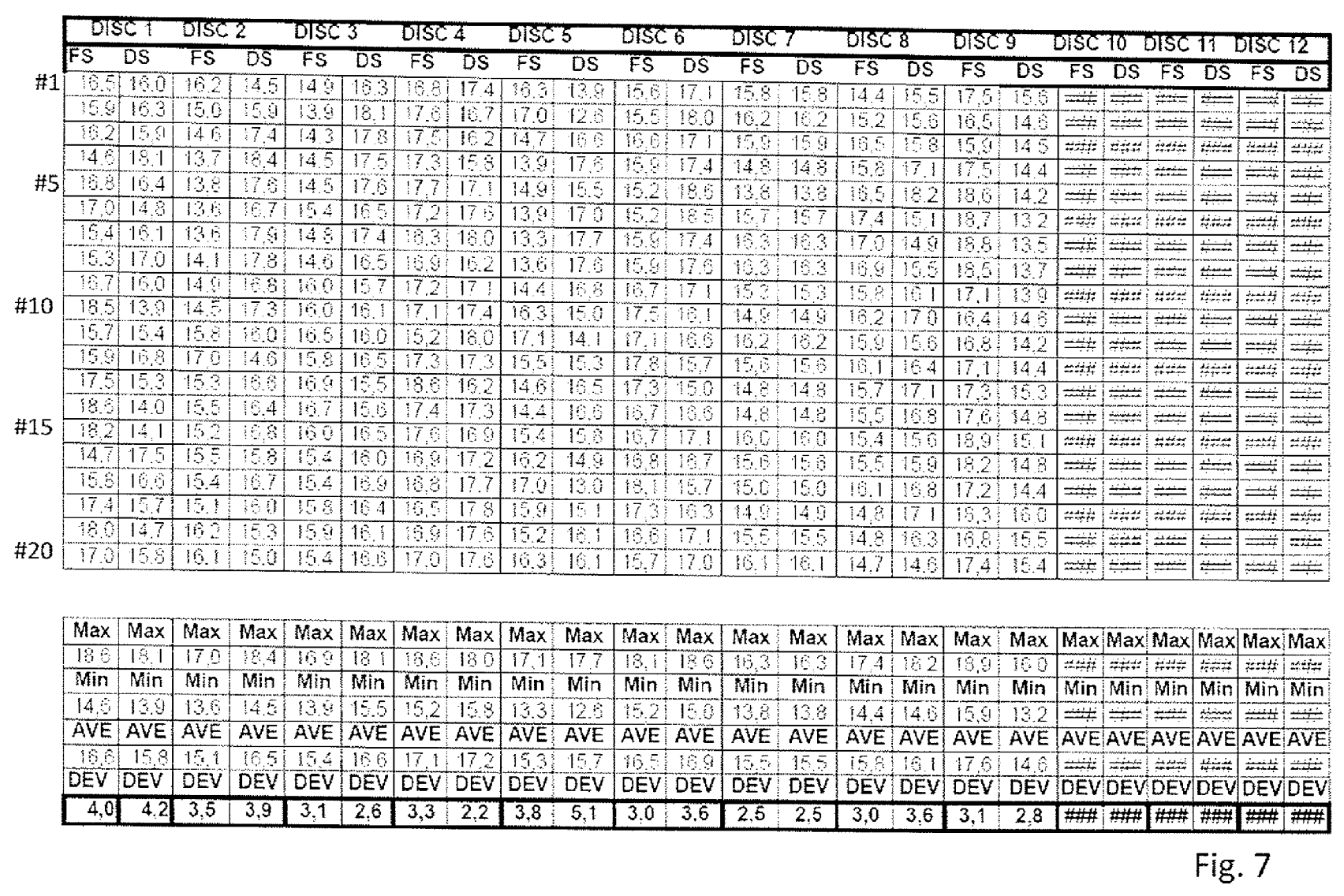

FIG. 7 shows a measurement protocol after use of the measuring equipment. A measurement has here been carried out on a disc filter with nine filter discs, DISC 1-DISC 9, and a representative measurement in the form of a mean value has been stored for each filter sector, #1-#20, both on the filtrate side FS (where the filtrate tank 2 is located) and on the driving side (where the motor drive is located). In the summary under measurement data, the maximal measurement, Max, and the minimum measurement, Min, are presented for each filter disc, with a mean value AVE that has been formed for these measurements and the spread DEV between the maximum and the minimum measurements. It can be seen from the measurement data that filter disc 1, DISC 1, and filter disc 5, DISC 5, have the greatest spread between the minimum and the maximum measurements, with spreads of 4.2 mm and 5.1 mm, respectively, on the driving side (DS) of the filter disc.

It is possible to determine which filter discs and which filter sectors are to be adjusted, on the basis of the measurement results that have been collected. If an acceptable spread of the deflections of the filter discs is 4.0 mm, it can be seen that filter disc 1 and filter disc 5 have a larger maximal spreads/deflections of 4.2 mm and 5.1 mm, respectively.

If filter disc 1, DISC 1, is to be adjusted in order to minimise the spread of deflections of the filter discs, it can be seen that:
  filter sector #4 has the lowest measurement (14.6) on the filtrate side, and also the greatest measurement (18.1) on the driving side, while filter sector #16 also has the smallest measurement (14.7) on the filtrate side and the greatest measurement (17.5) on the driving side.
  filter sector #10 has not only the smallest measurement (13.9) on the driving side but also the greatest measurement (18.5) on the filtrate side, and that filter sector #14 has not only the smallest measurement (14.0) on the driving side but also the greatest measurement (18.6) on the filtrate side.

Thus, in order to reduce the spread for filter disc 1, filter sectors #4, #10, #14 and #16 are to be adjusted.

It is in the same way possible to see that for filter disc 5, filter sectors #2, #4, #7, #11 and #17 are to be adjusted, since #4 and #7 have spreads that are close to the maximum on the driving side, and since the others have spreads that are close to the maximum measurement on the filtrate side.

Adjustment of the filter sectors proceeds by first loosening the locking plates (not shown in the drawings) that are located between the filter sectors at their outer edges, and either bending the filter sectors into their place in the disc filter or also loosening the filter mounting and removing the filter sectors such that they can be realigned in a realignment device. Alternatively, exchange sectors can be used.

FIG. 8 shows a supplementary measurement protocol for the protocol shown in FIG. 7, after use of the measuring equipment. Here, only measurement results from one filter disc, DISC 5, on the filtrate side FS are shown, for the three first filter sectors #1-#3. As is made clear by the measurement protocol in FIG. 7, the mean values of the distance to the filter sector for the first three filter sectors #1-#3 were 16.3, 17.0 and 14.7, respectively. It can here be seen that filter sector #1 has a twist α of 0.8 mm from forward edge to rear edge of the filter sector, similar to the pattern of twisting shown for filter sector 30a in FIG. 6a. Filter sector #2, however, lies plane, without twisting, since the forward edge and the rear edge are at the same distance, 17.0 mm. Filter sector 3, however, has a much larger twist α of −5.0 mm from the forward edge to the rear edge of the filter sector, similar to the above-mentioned pattern of twisting shown for filter sector 30a in FIG. 6a. If an acceptable twisting for the deflection of the filter discs is 4.0 mm, it can be seen that filter sector #3 must be adjusted. This is achieved by first loosening the locking plates (not shown in the drawings) that are located between the filter sectors at its outer edge, and loosening also the filter mounting, after which the filter sector is rotated at its bottom, the fixing screws 36 are tightened and the locking plates are remounted.

The invention is not limited to the embodiments revealed above in which measurement results that have been collect are used to determine the deflections of filter sectors and their twists. It is possible in theory to use measurements collected before and after the adjustment to calculate the influence of the flow capacity of a complete filter disc and the complete disc filter and the improvement of the capacity that has been achieved. The measuring head can be placed also in a further measurement position closer to the hollow shaft, for example at half of the radius of the measurement circle MC in FIG. 2. This can be done if, for example, it is suspected that filter sectors are distorted when considered from the filter mounting out towards the filter periphery. Since the equipment can carry out the measurement rapidly and easily, validation of whether the filter sectors are plane or whether they need adjustment is obtained for a small extra consumption of time.

While the present invention has been described in accordance with preferred compositions and embodiments, it is to be understood that certain substitutions and alterations may be made thereto without departing from the spirit and scope of the following claims.

I claim:

1. A method for the measurement of the deflections of a filter sector in a disc filter, where the disc filter consists of at least one filter disc arranged at a rotating hollow shaft, which filter disc is constituted by at least 10 hollow filter sectors, each one of which is covered by a filter element and has a hollow filter mounting that is connected to the rotating hollow shaft in order to lead away the filtrate that has collected in the filter sectors, and where a fixed support frame that is independent of the filter disc is present mounted at a distance from each filter disc comprising:

a measuring head is mounted at the support frame with a measurement arrangement in the measuring head that measures the distance between the measurement arrangement and the surface of the filter disc, the hollow shaft is rotated while the measurement arrangement measures the distance between the measuring head and the surface of the filter disc at at least two measuring points on each filter sector, and the measured values that have been collected are stored in a data collection unit (PC) connected to the measuring head, after which the measurement results that have been collected are used to determine the current deflections of individual filter sectors and to constitute the information on which adjustment of the filter sectors in order to minimise the deflections is based.

2. The method according to claim 1, wherein measuring points that have been collect are coupled with a unique filter sector.

3. The method according to claim 2, wherein the measuring points that have been collected are coupled to a unique filter sector by synchronisation of the rotation of the hollow shaft with the collection of the measurements.

4. The method according to claim 2, wherein the measuring points that have been collected are coupled to a unique filter sector by detecting the start and end of a filter sector and by collecting the measurements across the relevant filter sector.

5. Equipment for the measurement of the deflection of a filter sector in a disc filter, comprising: the disc filter consists of at least one filter disc arranged on a rotating hollow shaft, which filter disc is constituted by at least 10 hollow filter sectors each one of which is covered by a filter element and has a hollow filter mounting that is connected to the rotating hollow shaft in order to lead away filtrate that has collected in the filter sectors, and where a fixed support frame that is independent of the filter disc is mounted at a distance from each filter disc, the equipment comprises a measuring head with a quick release coupling by which it is mounted on the support frame, a position sensor in the measuring head that measures the distance between the measurement arrangement and the surface of the filter disc in order to form the momentary measurement result, a data transfer link for the transfer of momentary measurement results from the measurement arrangement, a data collection unit connected to the measurement arrangement through the data transfer link with a memory for the storage of momentary measurement results, and synchronisation means for the coupling between momentary measurement results and the individual filter sectors while the hollow shaft is rotating.

6. The equipment according to claim 5, wherein the measuring head comprises a pre-stressed measurement probe that is held against the surface of the filter disc by a spring and that follows the surface of the filter disc continuously.

7. The equipment according to claim 6, wherein the tip of the measurement probe that is in contact with the surface of the filter disc is constituted by a running wheel that rolls on the surface of the filter disc.

8. The equipment according to claim 7, wherein the transition between two filter sectors forms a depression in the surface of the filter disc with a radius $R_1$ at the edge of the filter sector in intervals 5-20 mm, which edge radii form the depression, the running wheel has a radius that is in the interval 1-5 times larger than $R_1$.

* * * * *